3,479,231
WELDING PRODUCT AND PROCESS
David A Joseph, New Canaan, Conn., assignor to Eutectic Welding Alloys Corporation, New York, N.Y., a corporation of New York
No Drawing. Filed Nov. 12, 1965, Ser. No. 507,548
Int. Cl. B23k 35/36, 35/22; C22c 39/44
U.S. Cl. 148—24                                9 Claims

ABSTRACT OF THE DISCLOSURE

A consumable particle product comprising a mixture of resin flux coated metal particles and refractory carbide particles.

---

This invention relates generally to welding products and more particularly to a consumable welding product having improved characteristics.

There has always been a need in industry for a welding product that would be relatively easy to weld deposit and which would possess good impact resistance and abrasion resistance properties. A versatile method of depositing such a product is by the welding process generally know as flame spraying which utilizes the flame spraying of a particle product on the surface of a base metal. Heretofore, no welding particle product has been known that would be capable of being deposited by welding wherein the resultant weld deposit would have superior abrasive wear resistance combined with good impact resistance. One of the reasons for this has been the fact that heretofore particle products such as powders, capable of weld depositing a porosity free overlay having good abrasive wear resistance were restricted to alloy particle products containing boron. Such boron contents imparted to such deposits limited impact resistance, brittleness and other deficiencies.

It is the general object of the present invention to avoid and overcome the foregoing and other difficulties and objections to prior art practices by the provision of a welding particle product that would be capable of depositing a weld deposit having a combination of high abrasive wear resistance as well as good impact strength.

Another object of the present invention is to provide a particle welding product that would be capable of being weld deposited by a limited heat input welding torch such as for example the flame spraying torch described in U.S. Patent No. 2,786,779 issued to A. Long et al.

Still another object of the present invention is to provide a particle welding product substantially free of boron that would be capable of producing a relatively porosity free weld deposit.

The aforesaid objects of the present invention and other objects which will become apparent as the description proceeds are achieved by providing a welding product comprising a mechanical mixture of a flux-resin coated particle matrix product and refractory particle material.

It has been discovered that the combination of refractory carbide material in particle form for example minus 80 mesh which have heretofore been incapable of being weld deposited with a substantially boron free particle matrix can, when the refractory particles are mechanically mixed with a boron free particle matrix of the type described in copending patent application Ser. No. 458,-452 filed on May 24, 1965, be weld deposited to obtain a controllable relatively porosity free weld deposit having superior abrasive wear resistance in conjunction with good impact resistance. The matrix material as described in the copending patent application Ser. No. 458,452 can be in boron free particle form of copper, copper base alloys, bronzes, cupro-nickel, nickel silver alloys. silicon bronze alloys, aluminum-bronze alloys, nickel base alloys, nickel copper alloys, nickel molybdenum chromium iron alloys, nickel chromium alloys, nickel chromium molybdenum copper alloys, chromium nickel alloys, cast iron alloys, abrasive resistant cast iron alloys, corrosion resistant cast iron alloys, cobalt chrome tungsten alloys, cobalt base alloys, high speed steels, aluminum silicon alloys, aluminum manganese alloys and silver base alloys, all treated with a resin and flux mixture all as described in copending patent application Ser. No. 458,452. The refractory particle material can be chromium carbide, silicon carbide, titanium carbide, tungsten carbide or any mixtures in duplex form, triplex form, etc., thereof.

It has been discovered that the flux and resin treatment on the matrix particle material serves to wet the surface between the matrix material and the base metal and between the matrix material and the refractory particle additions to provide a weld deposit matrix having a good bond with the refractory material particle additions.

It is known and understood that whenever certain particle alloys are melted, there is a precipitation of refractory crystals such as for example, when a cobalt chromium tungsten alloy containing carbon is melted, chrome carbide crystals will form. With the additions on refractory materials, the resulting weld deposit of the particle mixture of matrix and refractory material will contain distributions of small carbide crystals that are precipitated and the refractory particle additions that were contained in the admixture. Consequently, the small refractory crystals will serve to give the weld deposit good impact strength and the larger refractory particles in the weld deposit will improve abrasion resistance. Depending on the size of the added refractory particles, the weld deposit can also be controllably imparted with improved sliding wear properties. Further, it has been found that certain of the additional refractory material when passed through the flame will have their extreme sharp edges slightly rounded which serves to provide a weld deposit without preferential strength concentrations that permit crack and failure. It has been found that the refractory particle additions to the matrix must be in the range, by way of 1 to 75% of refractory additions.

It will now be understood by those skilled in the art that the absence of boron in the alloy particles will allow the generation of a softer, impact crack free and corrosion resistant weld deposit matrix to hold the refractory particles.

Specific examples of mechanical mixtures of the suspect invention are as follows. However, it must be understood that the specific examples given are intended only for the purposes of explanation and should not be considered as limiting the scope and spirit of the present invention. In addition it must be understood that all alloy particles must be flux and resin coated as described in copending patent application Serial No. 458,452 filed on May 24, 1965 and copending patent application Serial No. 462,420 filed on June 8, 1965.

EXAMPLE 1

A mechanical mixture of:

(a) 30 to 99 percent by weight of alloy particles which have the following alloy constituents in the weight percentages indicated:

| Constituent: | Percent |
|---|---|
| Copper | 15–75 |
| Nickel | 10–30 |
| Zinc | 10–42 | and;

(b) 1 to 70 percent by weight of tungsten carbide particles.

A mechanical mixture of:

(a) 30 to 95 percent by weight of alloy particles which have the following alloy constituents in the weight percentages indicated:

| Constituent: | Percent |
|---|---|
| Carbon | 2–5 |
| Silicon | 0–4 |
| Manganese | 0–2 |
| Phosphorus | 0–1 |
| Iron essentially | balance | and;

(b) 5 to 70 percent by weight of a mixture of refractory particles as follows:

| Refractory: | Weight percent |
|---|---|
| Tungsten carbide | 0–100 |
| Chromium carbide | 0–100 |

EXAMPLE 3

A mechanical mixture of:

(a) 30 to 95 percent by weight of alloy particles which have the following alloy constituents in the weight percentages indicated:

| Constituent: | Percent |
|---|---|
| Carbon | 2–3.7 |
| Silicon | .25–1.6 |
| Manganese | .30–1.25 |
| Chromium | 0–30 |
| Nickel | 0–5 |
| Phosphorus | 0–4 |
| Iron essentially | Balance | and;

(b) 5 to 70 percent by weight of a mixture of refractory particles as follows:

| Refractory: | Weight percent |
|---|---|
| Tungsten carbide | 0–100 |
| Chromium carbide | 0–100 |

EXAMPLE 4

A mechanical mixture of:

(a) 30 to 95 percent by weight of alloy particles which have the following alloy constituents in the weight percentages indicated:

| Constituent: | Percent |
|---|---|
| Carbon | 1.2–4 |
| Silicon | .5–3 |
| Manganese | .3–1.5 |
| Nickel | 1–5 |
| Chromium | 12–35 |
| Copper | 0–3 |
| Molybdenum | 0–4 |
| Iron essentially | Balance | and;

(b) 5 to 70 percent by weight of chromium carbide particles.

EXAMPLE 5

A mechanical mixture of:

(a) 30 to 90 percent by weight of alloy particles which have the following alloy constituents in the weight percentages indicated:

| Constituent: | Percent |
|---|---|
| Carbon | .8–4 |
| Manganese | 0–.25 |
| Silicon | .3–1.5 |
| Chromium | 24–33 |
| Tungsten | 5–19 |
| Nickel | 0–25 |
| Cobalt essentially | Balance | and;

(b) 10 to 70 percent by weight of chromium carbide particles.

EXAMPLE 6

A mechanical mixture of:

(a) 30 to 90% by weight of alloy particles which have the following alloy constituents in the weight percentages indicated:

| Constituent: | Percent |
|---|---|
| Molybdenum | Up to 25 |
| Silicon | Up to 10 |
| Copper | Up to 3 |
| Chromium | Up to 25 |
| Iron | Up to 20 |
| Tungsten | Up to 4 |
| Nickel | Balance |

(b) 10 to 70% by weight of refractory particles as follows:

| Refractory: | Weight percent |
|---|---|
| Tungsten carbide | 0–100 |
| Titanium carbide | 0–100 |

The alloy particles can be made by a number of well known methods such as by atomizing a melt of the desired alloy composition. The refractory particles can also be produced by numerous known methods such as by grinding.

The above described alloy particles must be coated with a resin flux coating.

It has been found that for best results the resin utilized in the resin-flux mixture should be a soluble thermosetting resin such as, for example, a soluble phenolic resin. The thermosetting resin coated cobalt base particles have been found to be free flowing through the narrow flow conduits of the flame spraying welding torches. In addition the thermosetting plastics reach a plasticized state at high enough temperatures to allow their being passed through the heated flame spraying welding torches without their clogging either the torch flow passages or the torch tip passage. For facilitating the mixing of the resin with the flux and in the coating of the resin-flux mixture on the cobalt base alloy particles, it has been found that the resin should be soluble. Consequently, for optimum results, it has been found that a water soluble phenolic resin is most useful for the resin coating of the cobalt base alloy particles, although any known soluble thermosetting resin would have good utility.

Applicant has discovered a wide range of fluxes that have utility with the present invention when mixed with the resin to form a resin-flux mixture and coated upon the cobalt base alloy particles. Some of the fluxing materials that when taken alone or in various combinations as taught herein, have utility in the present invention, are alkali borates such as potassium pentaborate ($KB_5O_8$), potassium tetraborate ($K_2B_4O_7$), sodium tetraborate ($Na_2B_4O_7$), and borax ($Na_2B_4O_7 \cdot 10H_2O$); and alkali fluorides such as calcium fluoride ($CaF_2$), sodium fluoride (NaF), potassium fluoride (KF) lithium fluoride (LiF) and potassium bi-fluoride ($KHF_2$); and alkali chlorides such as calcium chloride ($CaCl_2$), sodium chloride (NaCl), potassium chloride (KCl) and lithium chloride (LiCl); and carbonates such as sodium carbonate ($Na_2CO_3$) calcium carbonate ($CaCO_3$) and potassium carbonate ($K_2CO_3$); and nitrates such as potassium nitrate ($KNO_3$) calcium nitrate ($CaNO_3$) and sodium nitrate ($NaNO_3$); and miscellaneous other constituents such as amorphous boron, zirconium silicate ($Z_2SiO_3$), boric acid ($H_3BO_3$) and bentonite.

Specific examples of fluxing ingredient combinations which can be utilized in the resin-flux mixture are of the following constituents in the weight percentages indicated:

FLUORIDE TYPE FLUXES

| Constituent | Broad Range, Percent | Preferred Range, Percent |
|---|---|---|
| Group I: | | |
| $CaF_2$ | Up to 100 | Up to 100. |
| LiF | Up to 4 | Up to 2. |
| Boric Acid ($H_3BO_3$) | Up to 65 | Up to 45. |
| $KHF_2$ | Up to 75 | Up to 35. |
| $KB_4O_7$ | Up to 70 | Up to 45. |
| Group II: | | |
| Zircon | Up to 75 | Up to 50. |
| Amorphous boron | Up to 10 | Up to 3. |
| $CaCO_3$ | Up to 50 | Up to 40. |
| Group III: | | |
| Bentonite | Up to 10 | Up to 10. |

The fluoride type fluxes outlined above can be in any of the following combinations:

(1) A flux combination of up to the maximum indicated weight percentages of any of the constituents of Group I above.

(2) A flux combination of up to the maximum respective indicated weight percentages of any of the constituents of Group I above with up to 75 percent by weight of any of the constituents of Group II up to the respective weight percentages indicated therein.

(3) A flux combination of any of the constituents of Group I (in the respective weight percentages indicated therein) with up to 10 percent by weight of the constituent of Group III.

(4) A flux combination of up to the maximum respective indicated weight percentages of any of the constituents of Group I above with a mixture of constituents from Group II and Group III above in the maximum indicated weight percentages with the proportion of the constituent mixture to be taken from Groups II and III to be determined in accordance with the following formula:

Total constituents to be taken from Group II not to be in excess of 100−7.5 (total constituents from Group III).

BORATE TYPE FLUXES

It has been found that the borate type fluxes having utility with this invention are combinations of $B_2O_3$ and CaO in various proportions ranging from 10% $B_2O_3$ to 90% $B_2O_3$ in the mixture combination.

BORATE AND FLUORIDE OR CHLORIDE TYPE FLUXES

A mixture of up to 50% by weight of $CaF_2$ and any borate type flux as outlined above.

A mixture of up to 10% by weight of LiF and any borate type flux as outlined above.

A mixture of up to 10% by weight of NaCl and any borate type flux as outlined above.

A mixture of up to 20% by weight of KCl and any borate type flux as outlined above.

A mixture of up to 10% by weight of $NH_4Cl$ and any borate type flux as outlined above.

A mixture of up to 20% by weight of $CaCl_2$ and any borate type flux as outlined above.

CHLORIDE TYPE FLUXES

Chloride type fluxes to be utilized in the resin-flux mixture of the present invention are of the following constituents in the weight percentages indicated:

| Constituent: | Percent |
|---|---|
| $NH_4Cl$ | Up to 20 |
| NaCl | Up to 35 |
| KCl | Up to 10 |
| $H_3BO_3$ | Up to 70 |

CHLORIDE AND FLUORIDE COMBINATION FLUXES

Chloride and fluoride combination type fluxes to be utilized in the resin flux mixture of the present invention are of the following constituents in the weight percentages indicated.

| Constituent: | Percent |
|---|---|
| $NH_4Cl$ | Up to 25 |
| $CaF_2$ | Up to 80 |
| KCl | Up to 5 |
| NaCl | Up to 10 |
| $H_3BO_3$ | Up to 70 |
| $CaCl_2$ | Up to 5 |
| LiF | Up to 5 |

It will be understood by those skilled in the art that the percentages of resin to be combined with the cobalt base alloy particles is controlled by the specific gravities of the resin and of the cobalt base alloy particles and by the surface area, volume, and particle size distribution of the particles to be coated. It will be further understood that the amount of resin decreases or increases as the surface area to volume ratio of the particles to be coated respectively decreases or increases.

It is believed that those skilled in the art can, from the teachings of this invention, easily determine the amounts of resin to be utilized with specific particle distributions of cobalt base alloy particles. For example, where the particles are of a normal distribution of not coarser than 100 mesh and not finer than 400 mesh and the resin is a water soluble phenolic resin, it has been found for effective results that a broad range of percent resin by weight which can be used in comparison to the weight of the particles, is from .05% to 5%; with a preferred range of .1% to 3% resin by weight in comparison to the weight of the particles to be coated.

The amounts of flux to be used is determined by the specific desired characteristics of the weld deposit which are determined by the application parameters and the base metal characteristics. It has been found that for most applications the amount of flux which must be mixed in the resin-flux mixture is in the broad range of .05% to 3% by weight as compared to the weight of the particles to be coated with a preferred range of .10% to .70% of flux weight as compared to the weight of the metal particles to be coated.

The fluxes can be combined with the resin in many ways; for example, the fluxes can be entrapped in the resin coating adhering to the surface of the metal particles or the fluxes if soluble can be dissolved in a soluble resin or dispersed through the soluble resin.

It will further be understood by those skilled in the art that for uniform coverage of the resin-flux mixture on the particle surface, the resins can be solvated in a compatible liquid, such as, for example, water or alcohol. The particles can be coated with the resin-flux mixture by many well-known ways, such as, for example, the particles and the solvated resin-flux mixture can be intermixed in a standard blender. In addition, heat can be provided to allow the resin-flux coatings on the metallic particle surface to set and form a bond.

It will thus be understood that the objects of the present invention have been achieved by providing a boron free welding particle product capable of depositing a relatively porosity free weld deposit having a combination of high abrasive wear resistance as well as good impact strength being capable of being weld deposited by a limited heat input welding torch.

I claim:

1. A consumable particle product comprising a mixture of thermosetting resin-flux coated matrix metal particles and refractory carbide particles.

2. A consumable particle product comprising a mixture of resin-flux coated metal particles and refractory carbide particles wherein said resin-flux coated metal particles comprise metal particles each of which metal particles is selected from the group consisting of Cu-base alloys, Fe-base alloys and Co-base alloys, with a resin flux mixture disposed on each of said metal particles with said flux in said resin flux mixture selected from the group consisting of fluorides, borates, mixtures of borates and fluorides, mixtures of borates and chlorides, chlorides, and mixtures of chlorides and fluorides; and wherein said refractory particles are selected from the group consisting of chromium carbide, silicon carbide, titanium carbide, tungsten carbide and mixtures thereof.

3. The consumable particle product mixture of claim 2 comprising:
   (a) 30 to 99% by weight of resin-flux coated metal particles in the following constituents in the weight percentages indicated:

| Constituent: | Percent |
   | --- | --- |
   | Copper | 15–75 |
   | Nickel | 10–30 |
   | Zinc | 10–42 | and;
   (b) 1 to 70 percent by weight of tungsten carbide particles.

4. The consumable particle product mixture of claim 2 comprising:
   (a) 30 to 95% by weight of resin-flux coated metal particles in the following constituents in the weight percentages indicated:

| Constituent: | Percent |
   | --- | --- |
   | Carbon | 2–5 |
   | Silicon | 0–4 |
   | Manganese | 0–2 |
   | Phosphorus | 0–1 |
   | Iron essentially | Balance | and;
   (b) 5 to 70 percent by weight of a mixture of refractory particles as follows:

| Refractory: | Weight percent |
   | --- | --- |
   | Tungsten carbide | 0–100 |
   | Chromium carbide | 0–100 |

5. The consumable particle product mixture of claim 2 comprising:
   (a) 30 to 95% by weight of resin-flux coated metal particles in the following constituents in the weight percentages indicated:

| Constituent: | Percent |
   | --- | --- |
   | Carbon | 2–3.7 |
   | Silicon | .25–1.6 |
   | Manganese | .30–1.25 |
   | Chromium | 0–30 |
   | Nickel | 0–5 |
   | Phosphorus | 0–4 |
   | Iron essentially | Balance | and;
   (b) 5 to 70 percent by weight of a mixture of refractory particles as follows:

| Refractory: | Weight percent |
   | --- | --- |
   | Tungsten carbide | 0–100 |
   | Chromium carbide | 0–100 |

6. The consumable particle product mixture of claim 2 comprising:
   (a) 30 to 95% by weight of resin-flux coated metal particles in the following constituents in the weight percentages indicated:

| Constituent: | Percent |
   | --- | --- |
   | Carbon | 1.2–4 |
   | Silicon | .5–3 |
   | Manganese | .3–1.5 |
   | Nickel | 1–5 |
   | Chromium | 12–35 |
   | Copper | 0–3 |
   | Molybdenum | 0–4 |
   | Iron essentially | Balance | and;
   (b) 5 to 70 percent by weight of chromium carbide particles.

7. The consumable particle product mixture of claim 2 comprising:
   (a) 30 to 90% by weight of resin-flux coated metal particles in the weight percentages indicated:

| Constituent: | Percent |
   | --- | --- |
   | Carbon | .8–4 |
   | Manganese | 0–.25 |
   | Silicon | .3–1.5 |
   | Chromium | 24–33 |
   | Tungsten | 5–19 |
   | Nickel | 0–25 |
   | Cobalt essentially | Balance | and;
   (b) 10 to 70 percent by weight of chromium carbide particles.

8. The consumable particle product mixture of claim 2 wherein said resin is a phenolic.

9. A consumable particle product mixture of claim 2 comprising:
   (a) 10 to 70 percent of a resin-flux coated material particles in the following constituents and the weight percentages indicated:

| Constituents: | Percent |
   | --- | --- |
   | Molybdenum | Up to 25 |
   | Silicon | Up to 10 |
   | Copper | Up to 3 |
   | Chromium | Up to 25 |
   | Iron | Up to 20 |
   | Tungsten | Up to 4 |
   | Nickel | Balance |

(b) 10 to 70 percent by weight of a mixture of refractory particles as follows:

| Refractory: | Weight percent |
   | --- | --- |
   | Tungsten carbide | 0–100 |
   | Titanium carbide | 0–100 |

References Cited

UNITED STATES PATENTS

| | | | |
| --- | --- | --- | --- |
| 3,293,029 | 12/1966 | Broderick et al. | 29—191.2 |
| 3,372,066 | 3/1968 | Quaas | 148—24 |
| 3,341,337 | 9/1967 | Quaas et al. | 117—105.2 |
| 3,254,970 | 6/1966 | Dittrich et al. | 29—191.2 |
| 3,291,653 | 12/1966 | Eilers | 29—191.2 |

L. DEWAYNE RUTLEDGE, Primary Examiner

T. R. FRYE, Assistant Examiner

U.S. Cl. X.R.

29—192, 495; 75—.5; 148—26

PO-1050
(5/69)

UNITED STATES PATENT OFFICE
CERTIFICATE OF CORRECTION

Patent No. U.S. 3,479,231         Dated   November 18, 1969

Inventor(s)   David A. Joseph

It is certified that error appears in the above-identified patent and that said Letters Patent are hereby corrected as shown below:

Column 1, Line 23, for "resistance" read --resistant--.

Column 1, Line 25, for "Know" read --known--.

Column 3, Line 10, insert --EXAMPLE 2--.

Column 4, Line 30, after "of" insert --a mixture of--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents